(12) United States Patent
Muller

(10) Patent No.: US 6,676,874 B1
(45) Date of Patent: Jan. 13, 2004

(54) METHOD OF SEALING A FASTENER BORE

(75) Inventor: Rudolph R. M. Muller, Frankfurt (DE)

(73) Assignee: Profil-Verbindungstechnik GmbH & Co. KG, Friedrichsdorf (DE)

( * ) Notice: Subject to any disclaimer, the term of this patent is extended or adjusted under 35 U.S.C. 154(b) by 1804 days.

(21) Appl. No.: 08/699,660

(22) Filed: Aug. 19, 1996

Related U.S. Application Data

(63) Continuation of application No. 08/157,653, filed on Nov. 24, 1993, now abandoned.

(30) Foreign Application Priority Data

Nov. 25, 1992 (DE) .......................................... 42 39 583

(51) Int. Cl.[7] .............................................. B29C 43/18
(52) U.S. Cl. ...................... 264/249; 264/267; 264/318; 411/303; 411/430
(58) Field of Search ................................. 264/249, 267, 264/318; 411/429, 430, 303, 301, 929

(56) References Cited

U.S. PATENT DOCUMENTS

| | | | |
|---|---|---|---|
| 1,632,991 A | * 6/1927 | Booth | 411/429 |
| 1,827,565 A | * 10/1931 | Reamer | 264/267 |
| 2,131,319 A | * 9/1938 | Greenholtz et al. | 411/429 |
| 2,206,881 A | * 7/1940 | Crowley | 411/429 |
| 2,500,897 A | * 3/1950 | Friedman | 264/249 |
| 2,741,288 A | 4/1956 | Johnson | |
| 2,815,787 A | 12/1957 | Podell | |
| 2,928,446 A | 3/1960 | James et al. | |
| 3,093,177 A | 6/1963 | Villo | |
| 3,121,129 A | 2/1964 | Knowlton | |
| 3,270,610 A | 9/1966 | Knowlton | |
| 3,797,547 A | 3/1974 | Shinjo | |
| 3,897,713 A | 8/1975 | Gugle | |
| 3,971,289 A | 7/1976 | Chaivre | |
| 4,425,065 A | 1/1984 | Sweeney | |
| 4,514,125 A | 4/1985 | Stol | |
| 4,555,206 A | 11/1985 | Sweeney | |
| 4,693,652 A | 9/1987 | Sweeney | |
| 4,729,705 A | 3/1988 | Higgins | |
| 5,044,852 A | 9/1991 | Sweeney et al. | |
| 5,133,630 A | 7/1992 | Hughes | |
| 5,273,383 A | 12/1993 | Hughes | |

FOREIGN PATENT DOCUMENTS

| | | |
|---|---|---|
| DE | 722760 A1 | 1/1988 |
| JP | 5745449 | 10/1982 |
| JP | 60175816 | 9/1985 |
| JP | 626375 | 1/1987 |
| JP | 626521 | 1/1987 |
| JP | 6319411 | 1/1988 |
| JP | 6323015 | 1/1988 |
| JP | 6323016 | 1/1988 |
| JP | 6334313 | 2/1988 |
| JP | 315851 | 4/1991 |

* cited by examiner

Primary Examiner—Edmund H. Lee
(74) Attorney, Agent, or Firm—Howard & Howard

(57) ABSTRACT

A method of sealing a bore, such as the threaded bore of a fastener, wherein the sealing element is preferably formed in place. The preferred sealing element is formed of a heat softenable plastically deformable material, such as a thermoplastic resin, which is heated and deformed radially in the bore into a mechanical interlock with the bore inside the surface, such as thread. In the preferred method, a plunger or ram is driven into the sealing element which is supported on a die element in the bore. In the most preferred method, the ram simultaneously heats and deforms the sealing element, sealing the bore opening. The preferred female fastener element includes a generally tubular body portion having an axial bore which may be threaded adjacent one end. The sealing element seals the opening to the bore and the opposite end may be sealed with a disk spaced from the threads and forming a chamber. The chamber receives the sealing element upon receipt of a male threaded element, such as a bolt, in the female fastener bore. The sealed fastener may then be installed in a structural element, such as a bracket, which may then be coated or encapsulated without contamination of the bore or threads.

25 Claims, 4 Drawing Sheets

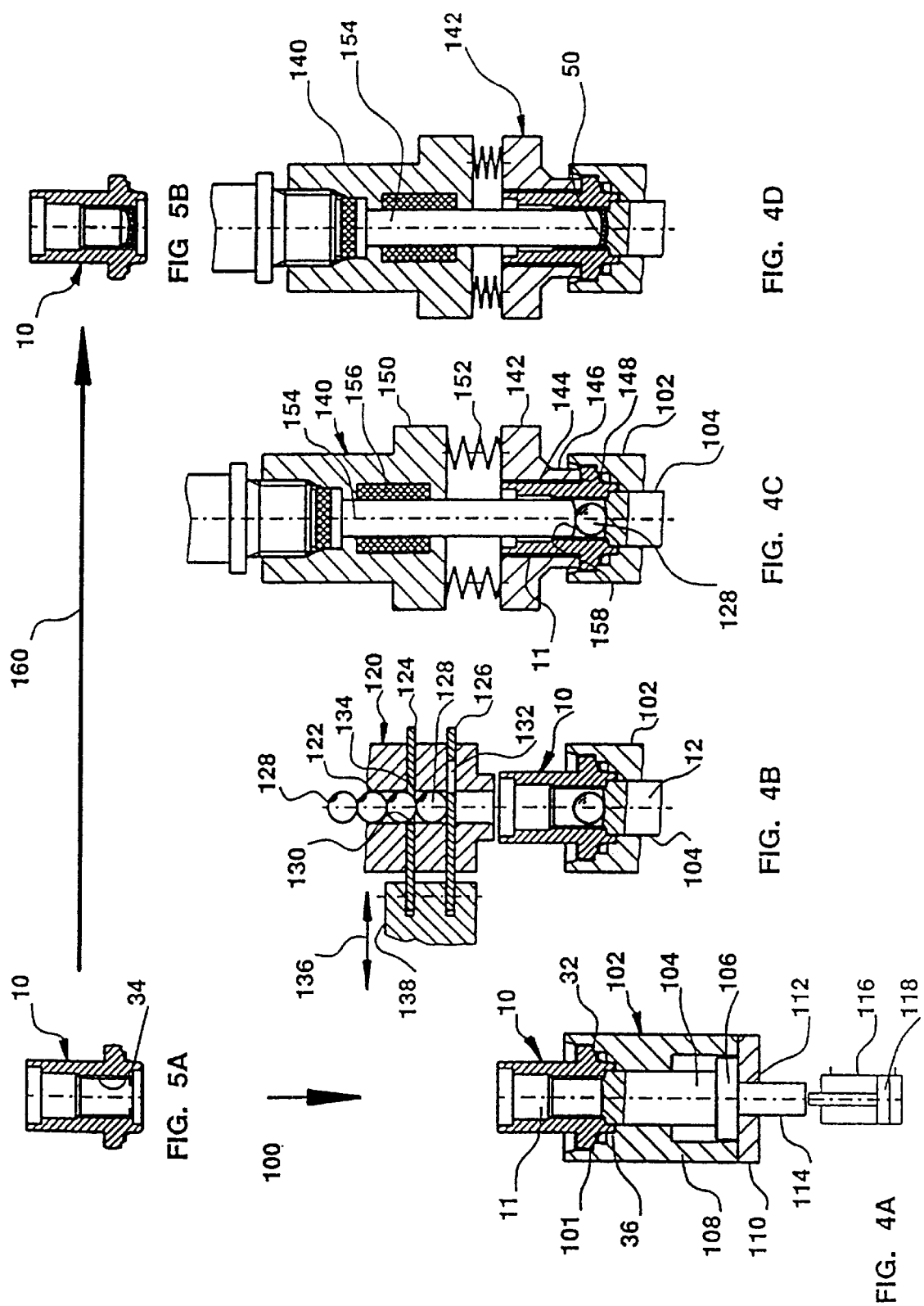

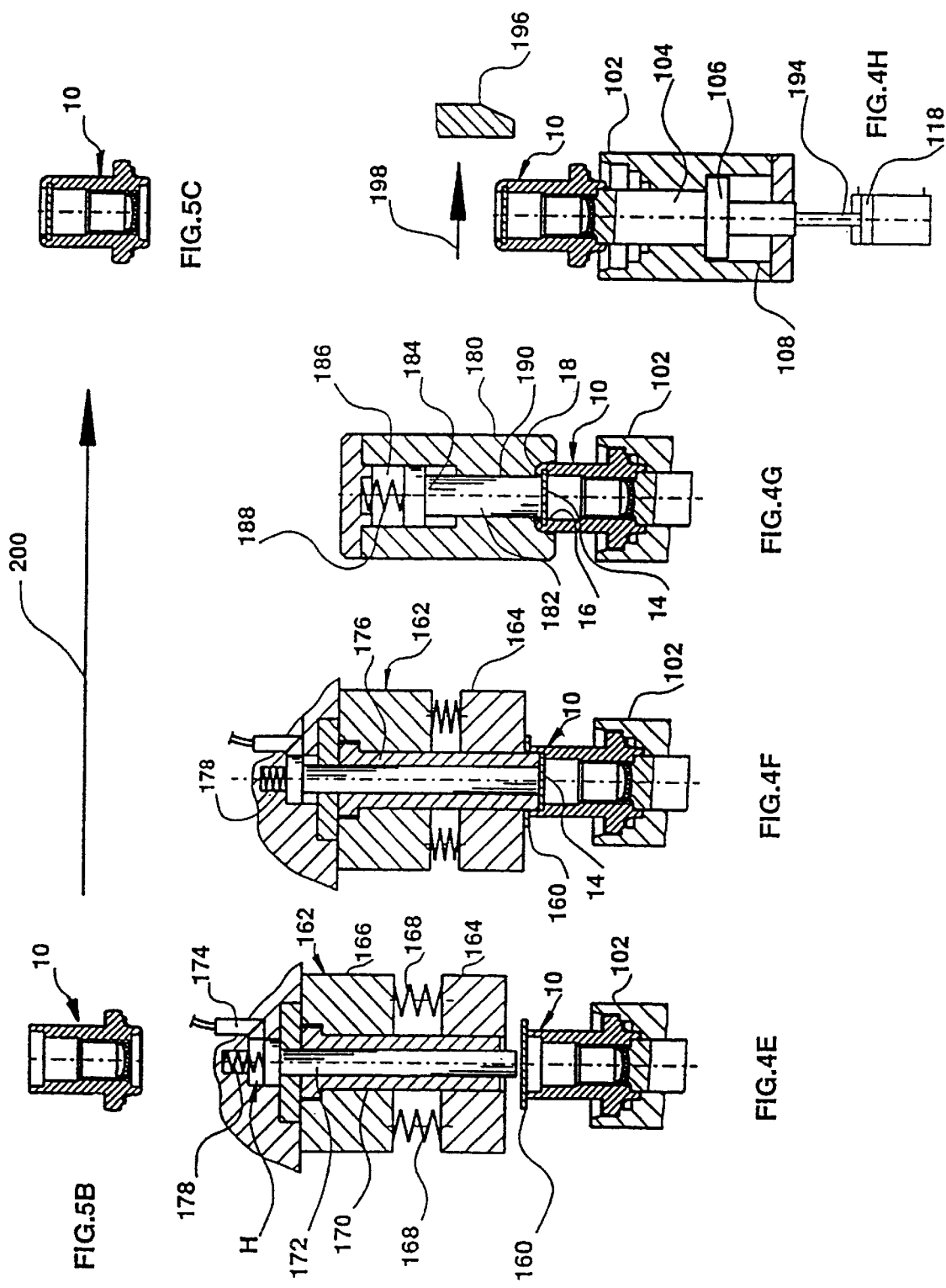

METHOD OF SEALING A FASTENER BORE

This is a continuation of application Ser. No. 08/157,653 filed on Nov. 24, 1993 now abandoned.

The present invention relates to a method of forming in place a female fastener bore opening and the fastener which, in the disclosed embodiment, is a a hat-shaped nut fastener sealed at the opposed bore openings.

BACKGROUND OF THE INVENTION

Hitherto hat-like fastener elements are known, e.g. in the form of cap or dome nuts, with an inner passage or bore which is provided with a fastening means, such as a thread or a bajonet socket and is closed at one end by means of a transverse wall. It is also entirely possible, and indeed preferred, for the fastener element to also have a rivet section at one end which can be inserted into a premanufactured aperture in a metal part and deformed by a riveting process in order to obtain a form-fitted connection between the fastener element and the sheet metal part.

Such hat-like fastener elements are known per se and are also of advantage when one is concerned with closing-off the thread of the fastener element or a bayonet connection at one end so that contamination can not penetrate into the thread.

As the fastening means, normally in the form of a thread, is normally located on the one side of the sheet metal part, while the mating screw is screwed into the nut element from the other side of the sheet metal, the riveted connection does not have to bear special forces in the assembled state of the fastener element, but rather, as a result of the threaded connection, an annular ring shoulder of the nut element on the same side of the sheet metal as the thread of the nut element is pressed by the clamping force of the screw against the sheet metal, with the riveted connection itself being largely relieved. Such cap nuts are thus also suitable for use in highly loaded screw connections.

A problem is however encountered when the sheet metal part with the attached hat-like fastener element has to be treated by further process steps before final assembly. Such further treatments include, for example, sand blasting, painting- in particular immersion painting and also the application of other protective layers. Through all these further treatment steps, the danger exists that the thread or the fastener means in the interior of the hat-like fastener element can be blocked or damaged so that it must either be freed from blockages or deposits in time consuming manual labor, or must indeed be scrapped.

It is known in the art to protect hollow cavities in critical components by plastic plugs which can be inserted and removed again. An example for this is a metal brake cylinder, the fluid supply opening of which is provided with a thread and is frequently also closed by a hat-shaped plastic plug. A problem with this solution is, however, not only that the closure plugs can be lost, but rather also that, with mass production, a large number of plastic plugs are required which must then be disposed of.

The present invention is based on the object of providing a fastener element or a sheet metal part with an attached fastener element which is so designed that an effective protection is achieved against blockage of or damage to the fastening means and also against deposits in the fastening means, without the parts which ensure protection being easily lost and leading to disposal problems, and with the fastener element being inexpensive to manufacture, for which purpose a special manufacturing process and a tool for the manufacturing of the fastener element should likewise be provided in accordance with the invention.

SUMMARY OF THE INVENTION

The method of sealing a fastener bore opening of this invention includes supporting a heat softenable plastically deformable sealing element in the bore opening having a diameter which is less than the bore opening, heating the sealing element to its softened plastically deformable temperature, then deforming the sealing element radially outwardly into mechanical interlocking engagement with the bore opening, which seals the bore opening when the sealing element cools. In the preferred method, the sealing element is deformed radially as described by a ram which is reciprocated through the bore opening into engagement with the sealing element. In the most preferred method of this invention, the sealing element is supported on a die member in the bore opening and the ram, which in the most preferred embodiment is heated, deforms the sealing element in the die member into mechanically interlocking relation with the female fastening element in the bore opening. As described, the female fastening element may be a threaded portion in the bore or a bayonet connection. Where the ram is heated, the ram simutaneously heats and radially deforms the sealing element in the fastener bore, as described.

The sealing element or closure plug is so deformed that it enters into a form-fitted connection with the fastener element and thus can not be easily lost, and together with the transverse wall protects the interior of the fastener element with the fastening means, i.e. with the thread or the bayonet socket, against the penetration of undesired media such as paint, rubber, plastic or underseal. Since the plastic closure plug which has been deformed to a type of disc can be pressed inwardly, the path to the thread or to the bayonet socket is first exposed by displacement of the closure plug on insertion of the screw. The closure plug is then preferably received in a receiving chamber formed at the end of the fastener means adjacent the transverse wall and thus remains within its completed fastening. In this manner, the disposal of the closure plugs in the factory where the sheet metal part is manufactured is not necessary at all. On scrapping the article, for example a motor car, the few closure plugs which are built into the car are disposed of through the melting down of the metal.

The closure plugs could indeed consist of a soft metal for example a lead alloy or aluminum, however preferred are closure plugs of thermo-plastic polymeric material, such as polyethylene, since these are usually deformable with a low expenditure of force on simultaneous heating, but readopt a solid form again after deformation and are thus protected against loss.

In a fastener element with the form of a nut with an inner thread, the closure plug is preferably retained by a form-locked fit with the thread at the entry to the thread. In this way the thread serves a double purpose in that it functions on the one hand as a fastening means, and on the other hand, however, also forms the desired form-fitted seat for the deformed closure plug. It is accordingly not necessary to provide a special seat for the deformed closure plug, for example in the form of a special undercut, so that the constructional length of the fastener element is not unnecessarily increased and the manufacturing costs are reduced.

In this design the closure plug preferably projects, in at least substantially sealed manner into at least one thread turn, preferably to approximately two and a half thread turns, but should not however completely fill these out, but rather should have a spacing from the root of the thread turns and be at least substantially rounded, and preferably approximately semicircularly rounded, at its side facing the root of the thread turns. This design of the closure plug in the deformed state ensures on the one hand the sealing of the thread, and also ensures that the closure plug cannot be easily lost. On the other hand this design also facilitates the pressing of the closure plug into the thread or into a receiving chamber at the far end of the thread.

It is particularly favorable when the closure plug has a cup-shaped recess at the side facing the interior of the hat-like element, preferably a recess with a slightly concavely rounded base. Furthermore, the closure plug should have a slightly convexly curved surface at the outer side which extends at least substantially parallel to the slightly concavely extending base of the cup-shaped or pot-like recess. Through this design the pressure forces which are exerted during a sand blasting treatment or during an immersion treatment on the closure plug, only lead to a slight flattening of the closure plug, whereby the latter is pressed more firmly into its seat at the start of the thread. On the insertion of a screw a somewhat higher force can however be applied so that the initially convexly outwardly directed base of the closure plug is deformed into a convexly inwardly arched form, whereby the closure plug is lifted out of the thread and can then be pressed with little force to the far end of the thread.

It would also be conceivable to form the closure plug so that it is penetrated by the screw and thereafter forms a plastic ring which serves to secure the inserted screw against rotation.

As already indicated, a receiving chamber for the closure plug which has been displaced from its seat is preferably provided, with this receiving chamber lying in the interior of the hat-like fastener element close to the transverse wall and being formed as a ring chamber. The receiving chamber preferably has a diameter which corresponds, at least substantially, to the outer diameter of the counter element or to the outer diameter of the thread, but which is not smaller than the latter.

The transverse wall itself is preferably formed by a disc, in particular a disc generated during a stamping process. This disc preferably sits on an annular or ring-shaped shoulder of the fastener element and closes the receiving chamber for the plug at the end face of the element remote from the thread. The disc itself is preferably retained by a radially inwardly directed, annular rivet rim formed from the material of the fastening element, with the rivet rim and the ring shoulder forming a radially inwardly open ring groove in which the periphery of the disc is held in form-fitted manner.

The invention also includes a sheet metal part with at least one hat-like fastener element of the previously described kind which is secured therein by a riveting process. The sheet metal part can also be a semi-finished product which is sand blasted or particle blasted on at least one face and is covered with a plastic, rubber or paint layer. Three specific examples for such sheet metal parts are, for example, a suspension strut mount of a vehicle, an engine bearer consisting of sheet metal and rubber for a vehicle, or a mounting device for an anti-roll bar consisting of a sheet metal bracket with inserted rubber.

A particular method for the manufacture of a hat-like fastener element, in particular a fastener element as previously described, wherein the hat-like mounting element has an inner passage which is provided with a fastening means, such as a thread or a bayonet socket, and is closed at or close to one end by means of a transverse wall, with the fastener element preferably having a riveting section at one end, is characterized in that a closure plug consisting of a deformable material is introduced into the fastener element which is at least partly received in a matrix and is squashed and plastically deformed between the matrix and a ram moved into the passage in such a way that it is held in a form-fitted manner in a seat provided within the fastener element and hereby closes the one end of the passage; and in that the respective other end of the passage is subsequently closed by a disc forming the transverse wall which is placed on a ring shoulder of the fastener element and is preferably retained in contact with this ring shoulder by a rivet rim formed by a forming process from the material of the fastener element.

Whereas, with a customary sealing technique requiring the insertion of a removable plug, this plug is inserted into the otherwise finished fastener element, in the method of the invention the closure plug is first inserted and then the disc forming the transverse wall. This method makes it possible to apply to the closure plug the forces which are necessary to deform it. When the closure plug consists of thermoplastic polymeric material, then the ram is preferably heated, to reduce the force required for deformation of the plug. Here the temperature of the ram should be selected so that the plug does not melt, but rather simply becomes softened or somewhat pasty and can easily be brought into the final form. Through the deformation of the closure plug, the latter then also comes into contact with an extended surface of the hat nut element and also the matrix, whereby heat is withdrawn from the closure plug, and at least an initial solidification is achieved which ensures that the ram can be removed without simultaneous removal of the closure plug. A spray mist of a parting agent can be sprayed into the passage of the nut, or onto the end face of the ram, so that the ram does not stick to the closure plug. In similar manner a small quantity of a parting agent can previously be sprayed into the toolholder in order to avoid a sticking of the closure plug here.

The disc is preferably formed by a slug stamped out of a piece of sheet metal which represents a favorably priced possibility for the manufacture of the disc, and thus of the fastener element.

The toolholder preferably contains a movable ejection pin which serves for the ejection of the fastening element after the insertion of the closure plug and presses against a metallic surface of the fastener element. In this way it is prevented that the ejection pin solely presses on the plastic plug and possibly prematurely displaces the plug from its seat.

When the method is carried out with a movable ejection pin then the end face of the ejection pin is preferably also exploited for the squashing process in the sense that it serves as the counter pressure element to the ram.

The method is preferably carried out as follows with a multi-station tool:

a) in a first station the fastener elements are individually received in the matrices, b) in a second station, which can optionally be integrated into the first or third station, and then omitted as a separate station, the balls forming the closure plugs are individually inserted into the respective fastener elements, c) in a third station the ram is moved into the passage of the fastener element to squash and deform the ball forming the closure plug and, on laying out of the tool for closure plugs consisting of thermo-plastic material, the ram is heated, d) in a fourth station a piece of sheet metal in strip form is guided transverse to the direction of movement of the fastener elements through the stations over the still open end face of the respective fastener element and, while using the open end face of the respective fastener element as a stamping matrix, a disc-like stamping slug is stamped out of the sheet metal and placed in firm contact against a ring shoulder of the respective fastener element by means of a stamping tool, e) in a fifth station the edge of the respective fastener element which projects upwardly above the stamped slug is formed by means of a forming tool into a radially inwardly directed rivet rim, and hereby the stamped slug is fixed in form-fitted manner in the respective fastener element, and f) in a sixth station the finished hat-like fastener elements are ejected by means of an ejection pin movably arranged in the matrix, wherein a plurality of matrices are provided and are movable around a transport circuit from station to station in order to hereby bring about the transport of the respective fastener elements into the various stations.

The invention will now be explained in more detail with reference to embodiments and to the drawing in which are shown:

BRIEF DESCRIPTION OF THE DRAWINGS

FIGS. 4A to 4H various steps during the manufacture of the fastener element, and FIGS. 5A to 5C representations of the fastener element in relation to the various stations of its manufacture, with FIG. 5A showing the starting element, FIG. 5B the semi-finished element with the inserted plug, and FIG. 5C finally reproducing the finished fastening element once again, the FIGS. 5A, 5B and 5C being aligned with the respective manufacturing steps in accordance with FIGS. 4A to 4H.

DESCRIPTION OF THE PREFERRED EMBODIMENTS

Figures 1, 2:
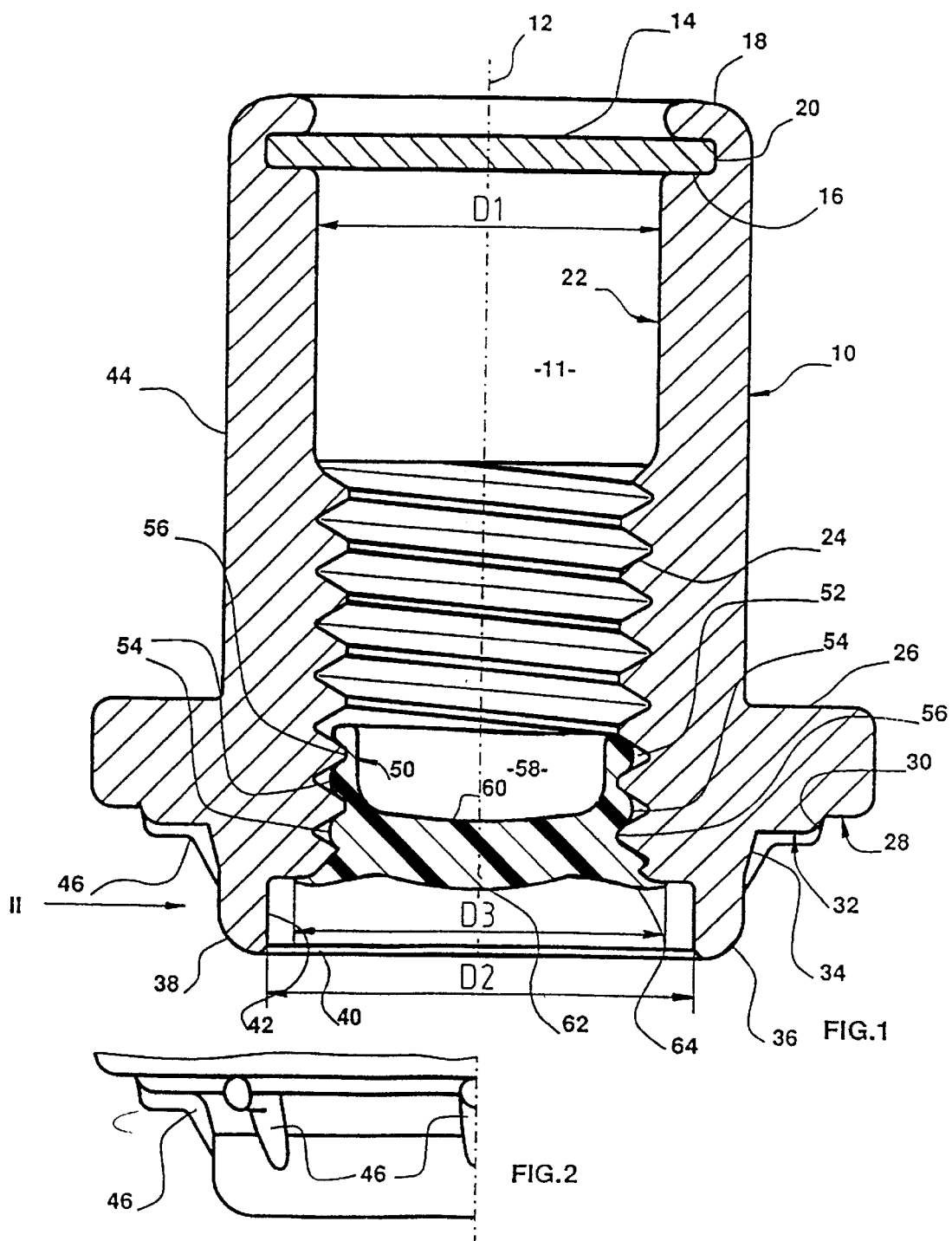
FIG. 1 a longitudinal cross-section through a finished hat-like fastener element in the form of a hat nut FIG. 2 a side view of a part of the hat nut of FIG. 1 in the direction of the arrow II in FIG. 1, FIGS. 3A to 3C three manufacturing steps during the manufacture of a sheet metal element in the form of a wheel strut mount with an attached fastener element.

Referring to FIG. 1, a hat-like fastener element in accordance with the invention in the form of a dome nut 10 is shown in longitudinal cross-section, with the central longitudinal axis of the dome nut being given by the reference numeral 12. A passage 11 extends in the longitudinal direction of the fastener element through the latter.

The dome nut 10 includes at its upper end a disc 14 which sits on an inner ring shoulder 16 of the dome nut and is held in form-fitted manner by means of a radially inwardly deformed end 18 of the dome nut. In other words, the rivet rim 18 and the annular ring shoulder 16 together form a ring-like recess 20 in which the edge region of the circular disc 14 is fixed. Directly beneath the disc 14, there is located a cylindrical receiving chamber 22, the diameter "D1" which corresponds to the outer diameter of the threaded part 24. At its lower end in FIG. 1, the dome nut has a flange portion 26 which has a relatively large contact surface 28 area-wise at its lower side which, in the in-built state of the dome nut, lies in areal contact with one side of the sheet metal part. This ring surface 28 merges via a small step 30 into a further annular ring surface 32 which finally also forms a part of the contact surface of the dome nut. This ring surface 32 then leads into a short conical portion 34 of the dome nut with a relatively steep cone angle of approximately 30°. This cone-shaped portion 34 finally merges into a ring-like rivet section 36 with a rounded shoulder 38 at the outer side, and on the inner side a ring-like chamfer 40 which represents part of a conical surface with an included angle of approximately 90°. This short, partly conical, surface 40 then merges into a cylindrical recess 42 of the dome nut, i.e. a recess at the entry side of the thread. The inner diameter D2 in the cylindrical ring space 42 is somewhat larger than the outer diameter D1 of the thread.

The upper portion of the dome nut has a cylindrical outer wall 44 which, in this example, is of right cylindrical shape, but which could, however, also have a different shape if one desired this for a specific reason. For example, a polygonal shape of the here cylindrical part 44 would be conceivable.

Uniformly distributed around the ring surface 32 are rounded nose-like projections 46, eight in this example, which extend radially to the surface 32 and have limbs which run in the axial direction along the conical section 34. The purpose of these noses is to form a security against rotation on inserting the dome nut element into a sheet metal part so that on inserting the bolt or screw, the dome nut does not turn in the panel.

FIG. 1 also shows the deformed sealing element in the form of a plastic plug 50 which closes the thread 24 at the opening or entrance. One notices that the length of this closure plug, i.e. in the direction of the central longitudinal axis 12 of the dome nut, amounts to from about two and a half to three thread turns and that the plug partly projects into the thread. The plastic material of the plug 50 does not, however, reach to the root of the thread, but rather a space 52, which is approximately triangular in cross-section, i.e. spacing between the material of the closure plug and of material of the dome nut remains. If one considers the shape of the closure plug as a type of thread, then the thread has thread turns which are approximately semi-circular in cross-section. At the core diameter of the inner thread 24 the closure plug lies in intimate contact at 56 and forms a sealed connection here.

The closure plug has, moreover, a cup-shaped or pot-like recess 58, the base boundary 60 of which is slightly concavely rounded. The lower side of the closure plug in FIG. 1 is correspondingly convexly rounded and extends approximately parallel to the base surface 60 of the pot-like recess 58.

The lower side 62 of the closure plug has an outer diameter "D3" which is as large as or larger than D1, but smaller than D2. In this way, a ring-shaped annular lip 64 is formed which lies flush on the entrance to the thread and serves for a 100% seal of the thread at this position. The ring-shaped sealing lip 64 is relatively thin.

Figure 3A:
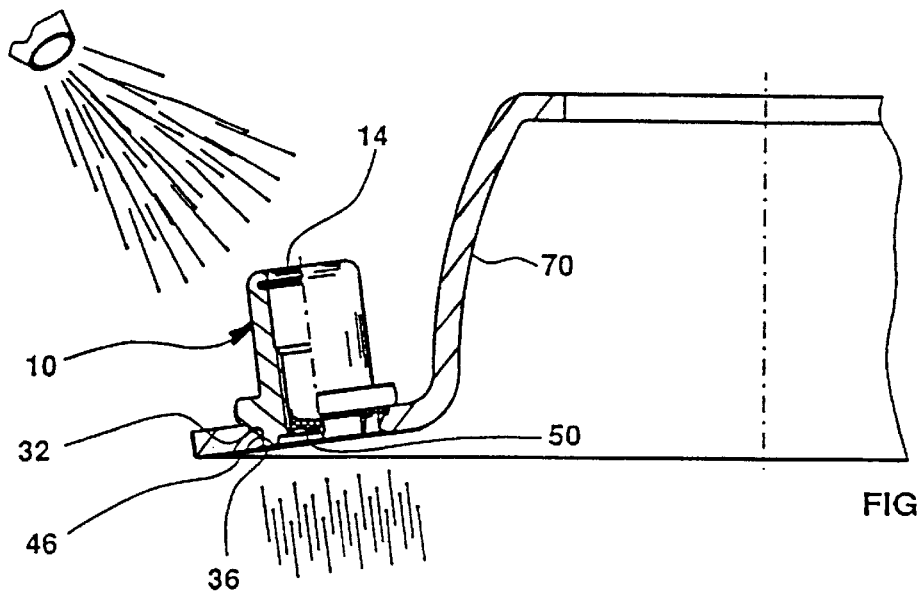
Figure 3B:
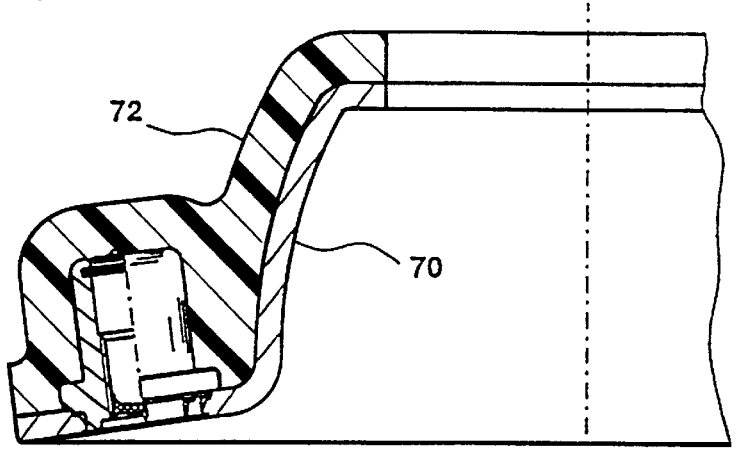
Figure 3C:
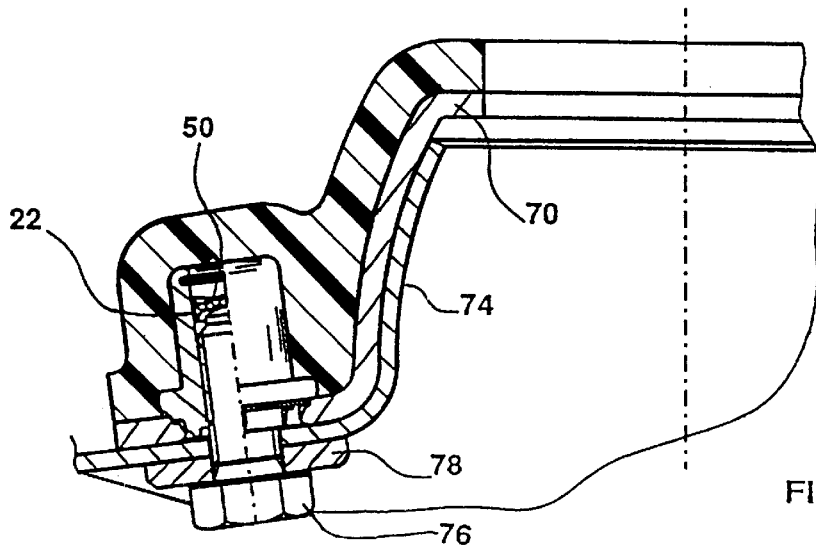

An example for the use of this dome nut is shown by the FIGS. 3A to 3C. In FIG. 3A one can see a partial cross-section through a strut mount of a motor car, i.e. through the so-called turret, which has three dome nuts 10 in accordance with FIG. 1 arranged in equal angular intervals around the turret, with only one dome nut being visible as a result of the illustration. The sheet metal part 70 is pre-apertured at the position of the dome nut, and the dome nut 10 has already been connected to the sheet metal part 70 by a riveting process. Through the riveting process, the noses 46 and also the ring surface 32 have been pressed into the material of the sheet metal 70 and the rivet section 30 has been so deformed that a form-fitted connection arises between the dome nut and the sheet metal part 70. One notes that the plastic closure plug 50 has withstood this riveting process undamaged. On carrying out the riveting process, a correspondingly shaped tool can, for example, be inserted into the cylindrical part 42 of the riveting section of the dome nut with the diameter "D2", while pressure is exerted on the flange part 26 via a ram, with a concavely rounded ring shoulder formed on the matrix driving the material of the riveting section 36 outwardly in order to form the form-fitted connection. The noses 46 prevent the dome nut turning on the insertion of a screw (as shown further below in FIG. 3C).

After the insertion of the dome nut 10, the sheet metal part 70 is first sand or bead-blasted with the blast impinging on the part both from above and from below. Penetration of the stream of beads into the interior of the dome nut is prevented on the one hand by the disc 14, and on the other hand by the closure plug 50.

After carrying out the blasting process, a massive protective coating layer 72, such as synthetic rubber, is cast onto the sheet metal part 70 and around the dome nut. This rubber layer principally forms a noise damping layer which prevents noises transmitted from the street via the wheel suspension radiating into the interior of the vehicle and there contributing to the general noise level. The rubber coating 72 also forms rust protection against premature rusting of this safety critical part. The rubber layer 72 can be seen in FIG. 3B.

FIG. 3C finally shows the assembly in the installed state, i.e. the in-built position in the motor car vehicle where the spring mount is placed on a further correspondingly shaped piece of sheet metal 74 and secured to the latter by a bolt 76, with a washer 78 being inserted between the head of the bolt 76 and the sheet metal part 74.

On the insertion of the bolt 76, the closure plug 50 is displaced, as can be easily be seen from FIG. 3C, into the ring-like chamber 22 of the dome nut. It can, however, also be seen from FIG. 3C that the riveted connection is not particularly loaded by the bolt. Instead, both the ring surface 32 and also the ring surface 38 of the dome nut are pressed against the sheet metal part 70, with this surface being so selected that the surface pressure which arises lies beneath the limiting value for the material of the sheet metal 70 or of the material of the dome nut 10.

The manufacture of the dome nut 10 of FIGS. 1 and 2 will now be explained in more detail in the following with reference to FIGS. 4A to H and also to the FIGS. 5A–C.

FIG. 5A first shows the blank fastener element 10 as it is received from an earlier manufacturing step, such as a cold heading machine. The entire chip forming machining of the fastening element has been completed so that it already has essentially the final shape, with the thread 34 being finally cut.

The arrow 100 shows that the fastener element 10 is moved downwardly via a non-illustrated separating device, which is however well known per se, and is placed into a toolholder 102. In this, the rivet section of the nut element 10 lies downwardly.

The toolholder has a receiving chamber 101 which is so formed that the ring surface 32 of the fastener element 10 lies on a ring step of the receiving chamber.

The toolholder 102 includes a movable ejection pin 104 which is so shaped at its upper end that precisely this end fits into the cylindrical ring space of the fastener element 10. The end face of the ejection pin 104 corresponds in its shape to the lower side of the finished inserted plastic closure plug of FIG. 1; that is, the end surface of the pin is slightly concavely shaped at the center.

As can be seen from FIG. 4A, the ejection pin 104 has a ring-like collar 106 which is accommodated in a cylindrical chamber 108 of the toolholder. The toolholder is closed at its lower side in FIG. 4A by a plate 110 which has a centrally arranged opening 112. A cylindrical projection 114 of the ejection pin 104 extends through this opening. One notes from FIG. 4A that the collar 106 lies flush against the plate 110, i.e. the ejection pin 104 is located in its lowermost position. Beneath the cylindrical projection 114, there is located a pneumatic ejection cylinder 116, the piston 118 of which is likewise located in the lowermost region. The matrix with the ejection cylinder 118 is located on a conveyor belt, for example formed by two chains extending parallel to one another, and serves not only for the support of the fastener element 10, but rather also for the transport of the respective fastener element 10 through the various stations of the multi-station tool. This signifies that a plurality of toolholders 102 arranged at the respective spacing of the stations are provided on the conveyor belt formed by the chains. In this way, all stations of the multi-station tool can operate in synchronism so that a very economic and cost effective manner of operation can be achieved. Although the toolholder is moved from station to station by the two non-ilustrated chains, it is braced at the lower side of the plate 110 on a fixed foundation in order to pick up the pressure forces which arise in the subsequent process steps.

After the fastener element 10 in the toolholder 102 has been received in the first station of the multi-station tool of FIG. 4A, and after one has checked that a fastener element 10 is actually present in the toolholder, for example by means of a light barrier or an air nozzle or a proximity switch or the like (not shown), the chains are moved on one step further to the right so that the toolholder 102 is now located in the second station of FIG. 4B. Here, for the sake of illustration, only a part of the toolholder and also of the ejection pin is shown. One notes, however, that the level of the toolholder has not changed.

In this second station of FIG. 4B the closure plugs are individually inserted into the respective mounting elements. The separating device is characterized here by 120, and one notes that this separating device has a central passage 122 in which a row of plastic balls of thermoplastic plastic material lie closely behind one another. Such plastic balls are continually topped-up so that the passage 122 is always full. Two plates 124 and 126 are located in the separating device 120 and have a mutual vertical spacing which corresponds to the diameter of the plastic balls 128. A hole 130 is located in the upper plate which is aligned in the illustration of FIG. 4B with the passage 122. The lower plate 126 also has a hole 132 which in the illustration of FIG. 4B is arranged displaced relative to the first hole 130, and indeed so that the hole 132 lies on the right hand side of the passage 122. One also notes from FIG. 4B that the upper plate 124 has an inclined ramp 134 on the right hand side of the passage. Both plates 124 and 126 are secured to a slider 138 which is movable to and fro in the direction of the double arrow 136.

In the illustration of FIG. 4B, a ball 128 already lies in the lower region of the fastener element 10 and lies in the concave recess of the end face of the ejection pin 104 centered relative to the central longitudinal axis 12 of the fastener element. As the slide 138 is still located in its extreme right hand position, the plate 126 completely closes the passage 122 so that the balls 128' which are located above the plate 126 cannot fall into the fastener element 10. The ball 128 also prevents further balls from sliding down into the fastener element.

After the insertion of the ball 128 into the fastener element 10 in accordance with FIG. 4B, the toolholder is transported by a further movement step of the conveyor means into the position of FIG. 4C. At the same time, a further toolholder (not shown) with an "empty" fastener element 10 moves into the position of FIG. 4B. The slider 138 is then moved to the left in accordance with the double arrow 136, and indeed through a distance which corresponds approximately to the diameter of the ball 128 so that the ball 128' of FIG. 4B now falls through the hole 132 into the new fastener element 10. As a result of this movement of the slide member 138 to the left, the plate 124 is also moved to the left, and the ramp 134 lifts the further balls 128 upwardly so that no further balls can drop down into the fastener element 10. After the one ball has fallen into the "new" fastener element, the slide 138 is then moved again to the right, whereby a further ball falls through the hole 134 onto the plate 126 so that the position of 4B has been established again for the new fastener element.

FIG. 4C shows a third station of the multi-station tool in which the toolholder 102 with the ejection pin 104 cooperates with a two-part press head 140. This press head 140 consists of a lower part 142 which has a cylindrical accommodation bore 144 for the outer circumference of the fastener element 10, and also a downwardly directed cylindrical projection 146 which is pressed against the ring surface 148 of the flange 26 of the fastener element 10 and holds the latter firmly in the receiving chamber of the matrix 102. Between the lower part 142 of the two-part press head 140 and the upper part 150 there are located spring elements which are schematically illustrated and provided with the reference numeral 152. Within the two parts 142, 150 of the press head 140, there is located a movable ram 154 which is heated via an inductive heating device 156 to a temperature at which the thermoplastic ball does not melt, but is however softened or pasty and easily formable.

In the station of FIG. 4C the illustration has been selected so that the two-part press head 140 has already travelled downwardly onto the fastener element, i.e. onto the toolholder, the heated ram has however not yet started to deform the ball 128. One notes from the illustration of FIG. 4C, that the end face 158 of the ram 154 which contacts the ball 128 has a convexly rounded shape which serves for the formation of the cup-shaped recess of the finished closure plug.

FIG. 4D then shows a further position in the third station in which the press head 140 has moved further downwardly so that the ram 154 has already pressed the plastic ball 128 into its final shape in accordance with the illustration of FIG. 1. FIG. 5B which is located directly above FIG. 4D then shows the shape of the fastener element 10 after this step, with the arrow 160 which extends from the illustration of FIG. 5A to FIG. 5B schematically illustrating the movements of the fastener element through the press between the first and third stations.

After the manufacturing step of FIG. 4D, the press head 140 is lifted so that the part 142 of the press head, and also the ram 154, can be removed from the fastener element, whereby a further step movement of the matrix with the respective fastener element 10 into the fourth station of FIG. 4E is possible.

With respect to the illustration of FIGS. 4C and 4D, it should also be noted that this apparatus succeeds in achieving about 30 strokes of the press head per minute so that the entire tool operates with a corresponding rhythm. The plastic balls are pressed at a temperature of the ram 154 of approximately 180° C. with a force of 1000 newtons. This is a continuous movement of the press head without a dwell time at bottom dead center, with the press head being lowered with a speed of approximately 25 to 30 mm/s, but being raised again in fast gear. It should also be mentioned that the presence of the plastic ball 128 in the fastener element 10 is checked in the stations of FIGS. 4B and 4C.

It i also noted that, although the illustration of FIGS. 4A–4D shows the preferred embodiment, it would eventually be conceivable to integrate the separating device 120 of FIG. 4B either in the first station of FIG. 4A or in the third station of FIG. 4C. The separating device 120 and the press head 140 could, for example, be movably arranged transverse to the conveyor direction so that first the separating device 120 and then the press head 140 come into use in the same station.

In the fourth station of FIG. 4E the fastener element 10 has the same shape as shown by the manufacturing step of FIG. 4D so that the illustration in FIG. 5B also applies for the illustration of the fourth station in FIG. 4E. In this station, the disc which forms the transverse wall of the fastener element 10 is produced from a steel strip 160 using the stamping tool 162.

The steel strip 160 is delivered from a supply roll behind the stamping tool 162 in the illustration of FIG. 4E and the apertured steel strip which remains after stamping out of a circular slug is either rolled up at the right side of the knife and tool or is simply stamped through and broken up into small sections which then fall into a tub and can subsequently be disposed of. In other words, the band 160 moves transversely to the conveyor direction of the matrix 102 through the multi-stage tool.

The stamping tool 162 is of two-part construction and has a lower part 164 which, as shown in FIG. 4F, is first pressed downwardly during the movement of the stamping tool 162 onto the upper side of the steel strip 160 and holds the latter in firm abutment on the fastener element 10. The upper part 166 of the two-part stamping tool is separated from the lower part by spring elements 168 and carries a stamping or cutting plunger 170 with a centrally arranged pin 172. The centrally arranged pin 172 is movably arranged by a small distance "H" relative to the upper part 166 of the stamping tool 162.

During downwardly directed movement of the stamping tool out of the position of FIG. 4E, the pin 172 first comes into contact with the steel strip 162 and is pushed upwardly by the downwardly directed movement of the stamping tool so that the distance "H" is reduced. As soon as the distance "H" has become substantially smaller, a signal is transmitted by the sensor 174 which shows that a steel strip 160 is actually present.

During the further downwardly directed movement of the stamping tool 162 the stamping plunger 170 moves downwardly sufficiently far that the disc which forms the transverse wall of the fastener element is stamped out from the steel sheet 160 and pressed down into contact with the ring shoulder of the fastener element. The process of stamping out takes place via a stamping or cutting plunger 170 which is a component of a stamping tool or of a part of a stamping too. This is then the position of the stamping tool 162 of FIG. 4F. During the stamping process the upper end of the fastener element serves as a stamping die. The stamping tool 162 is then lifted again and returns into the position of FIG. 4E with a compression coil spring 178 pressing the movable pin 172 downwardly again and hereby resetting the signal transducer 174. The signal transducer 174 can, for example, be a pneumatic device or a proximity sensor.

After the working step of FIG. 4F and the lifting of the stamping tool 162 the toolholder 102 moves on one step further to the right into the fifth station of the multi-station tool of FIG. 4G. Here, the rivet rim 18 is formed by means of a forming tool 180 and the rivet rim holds the disc firmly on the ring shoulder 16 of the fastener element 10. One notes that the forming tool 180 likewise has a centrally arranged hold-down pin 182 which is displaceably arranged relative to the forming tool 180, with this hold-down pin 182 having a cylindrical collar 184 which is displaceably mounted in a chamber 186 and is pressed downwardly by the compression coil spring 188. The hold-down pin 182 is guided in the axial direction through the guide wall 190.

After the pressing process in which the forming tool 180 is pressed downwardly in order to form the rivet rim, the fastener element 10 itself is finished, i.e. the matrix 102 can be moved on by one step further to the right through the lifting of the forming tool 180 into the ejection station of FIG. 4H. Here the pneumatic cylinder 116 is energized so that the piston 118 moves upwardly and the piston rod 194 drives the ejection pin 104 upwardly until the collar 106 contacts the upper boundary of the ring-like receiving chamber 108. One can see that the fastener element 10 is then lifted and is largely located outside of the toolholder 102. The fastener element is, however, still arranged on the upper end of the ejection pin 104. Through the further movement of the matrix 102, the fastener element strikes against a fixed abutment 196, as indicated by the arrow 198, so that the fastener element 10 executes a tilting movement and drops down from the ejection pin 104 into a suitably inclined channel from which it can pass into a non-illustrated connecting box.

FIG. 5C indicates that the fastener element 10 is now finished, i.e. has the precise form of FIG. 1. The further movement of the fastener element 10 through the press from the station of FIG. 4E up to the ejection in accordance with FIG. 4H is schematically illustrated with the arrow 200.

It should at this stage also be pointed out that several matrices 102 can be arranged in parallel alongside one another so that in each station two or more fastener elements 10 can be simultaneously processed. In this way, the output of the multi-station tool can be doubled or multiplied without a substantial additional effort, depending on how many fastener elements are located alongside one another in each station.

Finally, the empty toolholder in the station of FIG. 4H return on the lower side of the conveyor device back to the first station of FIG. 4A where they are ready to accept further blank fastener elements.

It should be emphasized that the stations of the multi-station tools need not necessarily be arranged in a row, they could for example be arranged in a circle at the circumference of a conveyor means formed as a carrousel.

What is claimed is:

1. A method of sealing a bore opening in a fastener member, comprising the following steps:
   a. supporting a sealing element in said bore opening, said sealing element being heat softenable and plastically deformable, said sealing element having a diameter less than said bore opening;
   b. heating said sealing element to a heat softened plastically deformable temperature at which temperature said sealing element softens and is deformable, but said temperature is below the melting temperature of said sealing element;
   c. mechanically deforming said sealing element radially outwardly into a mechanical interlocking engagement with said bore opening at said heat softened plastically deformable temperature; and
   d. cooling said sealing element below said heat softened plastically deformable temperature, said sealing element then sealing said fastener member bore opening.

2. The method of sealing a fastener member bore opening as defined in claim 1, wherein step c of said method includes disposing a ram through said opening bore into engagement with said sealing element, said ram deforming said sealing element radially outwardly into said mechanical interlocking relation with said bore opening.

3. The method of sealing a fastener member opening as defined in claim 2, wherein said method includes heating said ram prior to deformation of said sealing element, said heated ram then heating and deforming said sealing element upon engagement with said sealing element.

4. The method of sealing a fastener member bore opening as defined in claim 2, wherein said method includes supporting said sealing element in a die member in said bore opening, heating said sealing element in said die member to said heat softened plastically deformable temperature and then driving said ram against said sealing member, thereby deforming said sealing element radially outwardly in said die member.

5. The method of sealing a fastener member bore opening as defined in claim 4, wherein said method includes heating said ram and driving said heated ram against said sealing element, said ram simultaneously heating and deforming said sealing element in said die member radially outwardly into said mechanical interlocking engagement with said bore opening.

6. The method of sealing a fastener member bore opening as defined in claim 5, wherein said die member is concave and said ram has a convex end portion having a diameter less than said bore opening, said method including driving said convex end portion of said heated ram against said sealing element supported in said concave die member, said heated ram deforming said sealing element radially outwardly into a cup-shaped sealing element in said bore opening mechanically interlocked with said bore opening sealing said bore opening.

7. The method of sealing a fastener member bore opening as defined in claim 6, wherein said bore opening is a threaded opening, said method including deforming said sealing element radially outwardly to said threaded opening, forming a mechanical interlock between said sealing element and said threaded opening.

8. The method of sealing a fastener member bore opening as defined in claim 1, wherein said bore opening is a threaded opening and said sealing element is formed of a heat softenable thermo-plastic polymer, step c of said method including reciprocating a ram through said threaded opening into engagement with said heat softenable thermo-plastic polymeric sealing element, said ram deforming said heat softenable thermo-plastic polymeric sealing element radially outwardly into said threaded opening and forming an interlocking relation with said threaded opening.

9. The method of sealing a fastener member bore opening as defined in claim 8, wherein said method includes heating said ram, said heated ram then heating and deforming said heat softenable thermo-plastic polymeric sealing element.

10. The method of sealing a fastener member bore having a threaded opening as defined in claim 8, wherein said method includes disposing a generally spherical thermo-plastic sealing element having a diameter less than said threaded opening into said threaded opening and supporting said generally spherical thermo-plastic sealing element on a die member in said threaded opening, then reciprocating said ram through said threaded opening into engagement with said generally spherical thermo-plastic sealing element and substantially simultaneously heating said generally spherical thermo-plastic sealing element to its heat softened plastically deformable temperature, said ram deforming said generally spherical thermo-plastic sealing element radially outwardly in said die member into said mechanical interlocking engagement with said threaded opening.

11. A method of sealing a threaded bore, said method comprising the following steps:
   a. supporting a polymeric sealing element in said threaded bore, said polymeric sealing element being a heat softenable and plastically deformable polymer, said polymeric sealing element having a diameter less than said threaded bore;
   b. heating said polymeric sealing element to a heat softened plastically deformable temperature, at which temperature said polymeric sealing element softens and is deformable, but said temperature is below the melting temperature of said polymeric sealing element and substantially simultaneously mechanically deforming said polymeric sealing element radially outwardly into said threaded bore, said heat softened polymeric sealing element deforming into said threaded bore and forming a mechanical interlock with said threaded bore as said polymeric sealing element is deformed radially outwardly; and
   c. cooling said polymeric sealing element below its heat softenable plastically deformable temperature, said polymeric sealing element thereby sealing said threaded bore.

12. The method of sealing a threaded bore as defined in claim 11, wherein said method includes reciprocating a ram through said threaded bore into engagement with said polymeric sealing element, substantially simultaneously heating said polymeric sealing element to its heat softened plastically deformable temperature, said ram deforming said polymeric sealing element radially outwardly into said mechanical interlock with said threaded bore.

13. The method of sealing a threaded bore as defined in claim 12, wherein said method includes heating said ram, said heated ram then heating said polymeric sealing element to its heat softened plastically deformable temperature and substantially simultaneously deforming said polymeric sealing element radially outwardly into said threaded bore.

14. The method of sealing a threaded bore as defined in claim 13, wherein said method includes supporting said polymeric sealing element in a die member in said threaded bore, then heating and substantially simultaneously deforming said polymeric sealing element radially outwardly in said die member.

15. The method of sealing a threaded bore as defined in claim 14, wherein said ram includes a convex free end having a diameter less than said threaded bore, said method including driving said convex free end of said ram against said heat softened polymeric sealing element, deforming said polymeric sealing element radially outwardly around said convex free end into a cup-shaped sealing element in said threaded bore.

16. The method of sealing a threaded bore as defined in claim 15, wherein said polymeric sealing element is initially generally spherical, said method including supporting said generally spherical polymeric sealing element in said bore on said die member, then heating and substantially simultaneously deforming said generally, spherical polymeric sealing element into said cup-shaped sealing element.

17. The method of sealing a threaded bore as defined in claim 11, wherein said sealing element is formed of a thermo-plastic polymer and is initially generally spherical, said method including inserting said generally spherical thermo-plastic sealing element in said threaded bore and supporting said generally spherical thermo-plastic sealing element on a die member in said bore, then substantially simultaneously heating said generally spherical thermo-plastic sealing element to its heat softened plastically deformable temperature on said die member and deforming said generally spherical thermo-plastic sealing element radially outwardly into said threaded bore forming said mechanical interlock with said threaded bore.

18. The method of sealing a threaded bore as defined in claim 17, wherein said method includes reciprocating a ram through said threaded bore into engagement with said generally spherical thermo-plastic sealing element and substantially simultaneously heating said generally spherical thermo-plastic sealing element to its heat softened plastically deformable temperature, said ram then deforming said generally spherical thermo-plastic sealing element radially outwardly into said mechanical interlock with said threaded bore.

19. The method of sealing a threaded bore as defined in claim 18, wherein said ram includes a convex free end portion, said method including driving said ram convex free end portion into said generally spherical thermo-plastic sealing element, said ram convex free end portion then deforming said heat softened generally spherical thermo-plastic sealing element radially outwardly and around said convex free end portion forming a cup-shaped opening in said generally spherical thermo-plastic sealing element.

20. The method of sealing a threaded bore as defined in claim 11, wherein said threaded bore is located in a tubular portion of a fastener member, said tubular portion including an unthreaded free end, said method including sealing said tubular portion unthreaded free end by inserting a disk into said unthreaded free end of said tubular portion and deforming said unthreaded free end radially inwardly to secure said disk.

21. A method of sealing the ends of a generally tubular fastener element, said fastener element including an axial bore, a female fastening element adjacent a first end and a tubular end portion having a free end, said method including locating a deformable sealing element in said axial bore at said female fastening element, said deformable sealing element initially having a diameter less than said axial bore, then radially deforming said deformable sealing element into a mechanical interlock with said axial bore thereby sealing said first end of said fastener element, said method further including sealing said tubular end portion of said fastener element by inserting a metal disk in said tubular end portion and deforming said free end of said tubular end portion radially inwardly to mechanically secure said metal disk in said tubular end portion, thereby sealing said first end and said free end of said fastener element.

22. The method of sealing the ends of a generally tubular fastener element as defined in claim 21, wherein said method includes forming a counterbore in said tubular end portion having an internal diameter greater than said tubular end portion and forming an annular shoulder, then inserting said metal disk in said counterbore onto said annular shoulder, then deforming said free end of said tubular end portion radially inwardly mechanically securing said metal disk in said counterbore and sealing said free end of said tubular end portion.

23. The method of sealing the ends of a generally tubular fastener element as defined in claim 21, wherein said method includes locating a heat softenable plastically deformable polymeric sealing element in said axial bore opposite said female fastening element, said heat softenable plastically deformable polymeric sealing element having a diameter less than said axial bore at said female fastening element, then substantially simultaneously heating said heat softenable plastically deformable polymeric sealing element to its heat softened plastically deformable temperature at which temperature said heat softenable plastically deformable polymeric sealing element is softened and is deformable, but said temperature is below the melting temperature of said heat softenable plastically deformable polymeric sealing element, and deforming said heat softenable plastically deformable polymeric sealing element at said heat softened plastically deformable temperature radially outwardly into engagement with said female fastening element and forming a mechanical interlock between said heat softenable plastically deformable polymeric sealing element and said female fastening element, said heat softenable plastically deformable polymeric sealing element then sealing said axial bore.

24. The method of sealing the ends of a generally tubular fastening element as defined in claim 23, wherein said method includes reciprocating a ram through said axial bore into engagement with said heat softenable plastically deformable polymeric sealing element and substantially simultaneously heating said heat softenable plastically deformable polymeric sealing element to its softened plastically deformable temperature, said ram deforming said heat softenable plastically deformable polymeric sealing element radially outwardly into said mechanical interlock with said female fastening element.

25. The method of sealing the ends of a generally tubular fastening element as defined in claim 24, wherein said method includes heating said ram and said ram substantially simultaneously heating and deforming said heat softenable plastically deformable polymeric sealing element.

\* \* \* \* \*

UNITED STATES PATENT AND TRADEMARK OFFICE
CERTIFICATE OF CORRECTION

PATENT NO. : 6,676,874 B1
DATED : January 13, 2004
INVENTOR(S) : Rudolph R. M. Muller It is certified that error appears in the above-identified patent and that said Letters Patent is hereby corrected as shown below:

Column 12,
Line 6, please delete the word "opening" before the word "bore" and insert the word -- opening -- after the word "bore."

Signed and Sealed this

Sixth Day of April, 2004

JON W. DUDAS
*Acting Director of the United States Patent and Trademark Office*